United States Patent
Toyli et al.

(10) Patent No.: US 10,351,355 B2
(45) Date of Patent: Jul. 16, 2019

(54) AUTO CHANGEOVER INFEED ASSEMBLY

(71) Applicant: Douglas Machine Inc., Alexandria, MN (US)

(72) Inventors: Matthew D. Toyli, Parkers Prairie, MN (US); Richard W. Lukanen, Jr., Alexandria, MN (US); Christopher D. Harren, Sauk Centre, MN (US); Kevin P. Herickhoff, Sauk Centre, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 15/500,366

(22) PCT Filed: Aug. 3, 2015

(86) PCT No.: PCT/US2015/043413
§ 371 (c)(1),
(2) Date: Jan. 30, 2017

(87) PCT Pub. No.: WO2016/019373
PCT Pub. Date: Feb. 4, 2016

(65) Prior Publication Data
US 2017/0217692 A1    Aug. 3, 2017

Related U.S. Application Data

(60) Provisional application No. 62/032,162, filed on Aug. 1, 2014.

(51) Int. Cl.
*B65G 21/20* (2006.01)
*B65G 47/71* (2006.01)

(52) U.S. Cl.
CPC ......... *B65G 47/71* (2013.01); *B65G 21/2072* (2013.01)

(58) Field of Classification Search
CPC ............... B65G 21/20; B65G 21/2045; B65G 21/2063; B65G 21/2073; B65G 21/2072
(Continued)

(56) References Cited

U.S. PATENT DOCUMENTS

| 2,723,852 A | 11/1955 | Sanders |
| 4,432,189 A | 2/1984 | Raudat |

(Continued)

FOREIGN PATENT DOCUMENTS

| WO | 2007147005 | 12/2007 |
| WO | 2011145123 | 11/2011 |
| WO | 2012056145 | 5/2012 |

OTHER PUBLICATIONS

International Search Report from PCT/US2016/043413 dated Oct. 23, 2015 (8 pages), Blaine Copenheaver.
(Continued)

*Primary Examiner* — William R Harp
(74) *Attorney, Agent, or Firm* — Dicke, Billig & Czaja, PLLC

(57) ABSTRACT

Apparatus for automatic adjustment of guide rails for guiding articles on a conveyor via lanes is provided. The apparatus includes spaced apart first and second tracks, a carriage for driven travel along the first track, and a guide rail hanger for select slaved travel along the second track by the carriage in furtherance of lane adjustment. The guide rail hanger is operatively linked with a guide rail hanger positioning bar for select reversible affixation with respect thereto in furtherance of establishing a fixed guide rail position relative to the conveyor. A latch assembly, supported by the carriage, has a latch selectively operable for captured carrying of the guide rail hanger along the second track during travel of said carriage, the latch effectuating release of an affixed guide rail hanger from the guide rail hanger positioning bar in furtherance of enabling relocating
(Continued)

and re-affixing the guide rail hanger relative to the guide rail hanger positioning bar in advance of captured carrying thereof.

26 Claims, 6 Drawing Sheets

(58) Field of Classification Search
USPC ............ 198/836.1, 836.2, 836.3, 836.4, 442
See application file for complete search history.

(56) References Cited

U.S. PATENT DOCUMENTS

| | | | |
|---|---|---|---|
| 4,880,104 A | 11/1989 | Evans et al. | |
| 5,515,668 A | 5/1996 | Hunt et al. | |
| 5,546,734 A | 8/1996 | Monorief et al. | |
| 6,209,707 B1 * | 4/2001 | Ronchi | B65G 21/2072 198/445 |
| 6,827,203 B2 | 12/2004 | Andreoli et al. | |
| 7,207,428 B2 * | 4/2007 | Huttner | B65G 21/2072 198/444 |
| 7,520,380 B2 | 4/2009 | Ranger | |
| 7,607,531 B2 | 10/2009 | Bonhomme et al. | |
| 7,617,926 B2 | 11/2009 | Jacob et al. | |
| 8,087,509 B2 | 1/2012 | Schmid | |
| 8,235,201 B2 | 8/2012 | Miller et al. | |
| 8,651,264 B2 * | 2/2014 | Spindler | B65G 47/682 198/442 |
| 8,668,073 B2 | 3/2014 | Petrovic et al. | |
| 8,770,392 B2 | 7/2014 | Berger et al. | |
| 9,132,961 B2 * | 9/2015 | Franzaroli | B65G 15/44 |
| 2005/0217974 A1 | 10/2005 | Huttner | |
| 2009/0000914 A1 | 1/2009 | Bonhomme et al. | |
| 2010/0326015 A1 | 12/2010 | Miller et al. | |

OTHER PUBLICATIONS

Extended European Search Report for related Application No. 15827045.4 dated Feb. 15, 2018 (8 pgs).

* cited by examiner

AUTO CHANGEOVER INFEED ASSEMBLY

This is an international patent application filed under 35 USC § 363 claiming priority under 35 USC § 120 of/to U.S. Pat. Appl. Ser. No. 62/032,162 filed Aug. 1, 2014 and entitled AUTO CHANGEOVER INFEED ASSEMBLY, the disclosure of which is hereby incorporated by reference in its entirety.

TECHNICAL FIELD

The present disclosure is generally directed to one or more of systems, apparatuses, assemblies, subassemblies, and/or methods for automated lane width adjustment of lanes of a conveyor system, e.g., an article infeed portion of an article feed, group and package line. More particularly, the instant disclosure is directed to the automated location and relocation of article guides (i.e., guide rails or lane guides) of an article infeed station in furtherance of selectively delimiting the width of conveyed article travel lanes.

BACKGROUND

Articles such as, but not limited to containers, e.g., bottles, cans, etc., are generally supplied en mass via an infeed supply chute characterized by a conveyor and longitudinally extending guide rails of a guide rail unit which delimit discrete lanes of a select width to facilitate subsequent article grouping in advance of packaging. Commonly, the guide rails are adjustably supported along a positioning bar via conventional clamps (see e.g., U.S. Pat. No. 8,235,201 (Miller et al.), FIG. 1 depicting an upstream portion of an article nesting operation; note also U.S. Pat. No. 8,087,509 (Schmid), FIGS. 4 & 5), or contrariwise, lane guides are known to be adapted so as to carry a guide bar or the like having a selectively adjustable (manual) thickness (e.g., U.S. Pat. No. 7,617,926 (Jacob et al.), FIGS. 2 & 3) so as to selectively reduce lane width. Thus, modification of packaging lines to accommodate a change in a package grouping for a given article, or to change the article being processed, have and generally require processing line down time owing to manual adjustment and/or change parts.

While it is recognized in the art to automate what had been a manual adjustment or modification of article lane widths, many automated approaches are believed cumbersome, or at least perceived as such, and limited in processing flexibility. This is particularly the case for systems/apparatus characterized by multiple article conveying lanes, as opposed to single lane systems (see e.g., U.S. Pat. No. 6,827,203 (Andreoli et al.) and U.S. Pat. No. 7,520,380 (Ranger) wherein actuatable lane guides maintain a vertical alignment for a bottle (e.g., 11, 1.51, 21) routed therethrough in advance of filling). For example, threaded telescoping elements driven via a common shaft for uniform/collective lane guide adjustment (U.S. Pat. No. 4,880,104 (Evans et al.)), a rack and pinion carriage system for translating select lane guides in relation to a fixed central guide (U.S. Pat. No. 5,515,668 (Hunt et al.)), actuatable beams which slidingly support guide rails via linear bearings and guide rail supports (U.S. Pat. No. 5,546,734 (Moncrief et al.)), and, a master/slave approach characterized by a coordinated lever and link rod system for uniform/collective lane guide adjustment (U.S. Pat. No. 7,607,531 (Bonhomme et al.)) are heretofore known.

While arguably an advancement over manual adjustment approaches, each of the described multilane approaches are characterized by a degree of mechanical complexity. Thus, there remains a need to provided a precise versatile auto changeover assembly of elegantly simple design for universal multilane changeover. Moreover, facilitation of both nested and straight pack article/packaging processing, and conversion between such modalities, via an automated lane change approach is believed advantageous. Further still, a modular solution for in field systems is believed desirable in addition to provisions for an infeed station so characterized.

SUMMARY OF THE INVENTION

Apparatus for automatic adjustment of guide rails (i.e., lane guides) for guiding articles on a conveyor via lanes is provided. The apparatus includes spaced apart first and second tracks, a carriage for driven travel along the first track, and a guide rail hanger for select slaved travel along the second track by the carriage in furtherance of lane adjustment. The guide rail hanger is operatively linked with a guide rail hanger positioning or anchoring bar for select reversible affixation with respect thereto in furtherance of establishing a fixed guide rail position relative to the conveyor. A latch assembly, supported by the carriage, has a latch selectively operable for captured carrying of the guide rail hanger along the second track during travel of the carriage, the latch likewise effectuating release of an affixed guide rail hanger from the guide rail hanger positioning bar in furtherance of enabling relocating and re-affixing the guide rail hanger relative to the guide rail hanger positioning bar in advance of captured carrying thereof. More specific features and advantages obtained in view of those features will become apparent with reference to the drawing figures and DETAILED DESCRIPTION OF THE INVENTION.

BRIEF DESCRIPTION OF THE DRAWINGS

FIGS. 1-6 are provided herewith wherein:

FIG. 1 depicts, perspective side elevation view process flow figure left to figure right, an exemplary article infeed station characterized by three (3) contemplated auto changeover infeed assemblies or modules;

FIG. 2 depicts, plan view, a downstream portion of the station of FIG. 1 characterized by spaced apart, adjustable article guide lanes;

FIG. 3 illustrates, perspective side elevation upstream view select elements omitted, the auto changeover infeed assembly of FIG. 1, specifically, area "3" thereof;

FIG. 4 depicts an opposing view, perspective downstream, of the assembly of FIG. 3;

FIG. 5 illustrates, slight perspective side elevation select elements omitted, the auto changeover infeed assembly of FIG. 4, specifically, area "5" thereof; and, FIG. 6 illustrates, end elevation select elements omitted, the auto changeover infeed assembly of FIG. 1, specifically, section 6-6 thereof.

DETAILED DESCRIPTION OF THE INVENTION

Figure 1:
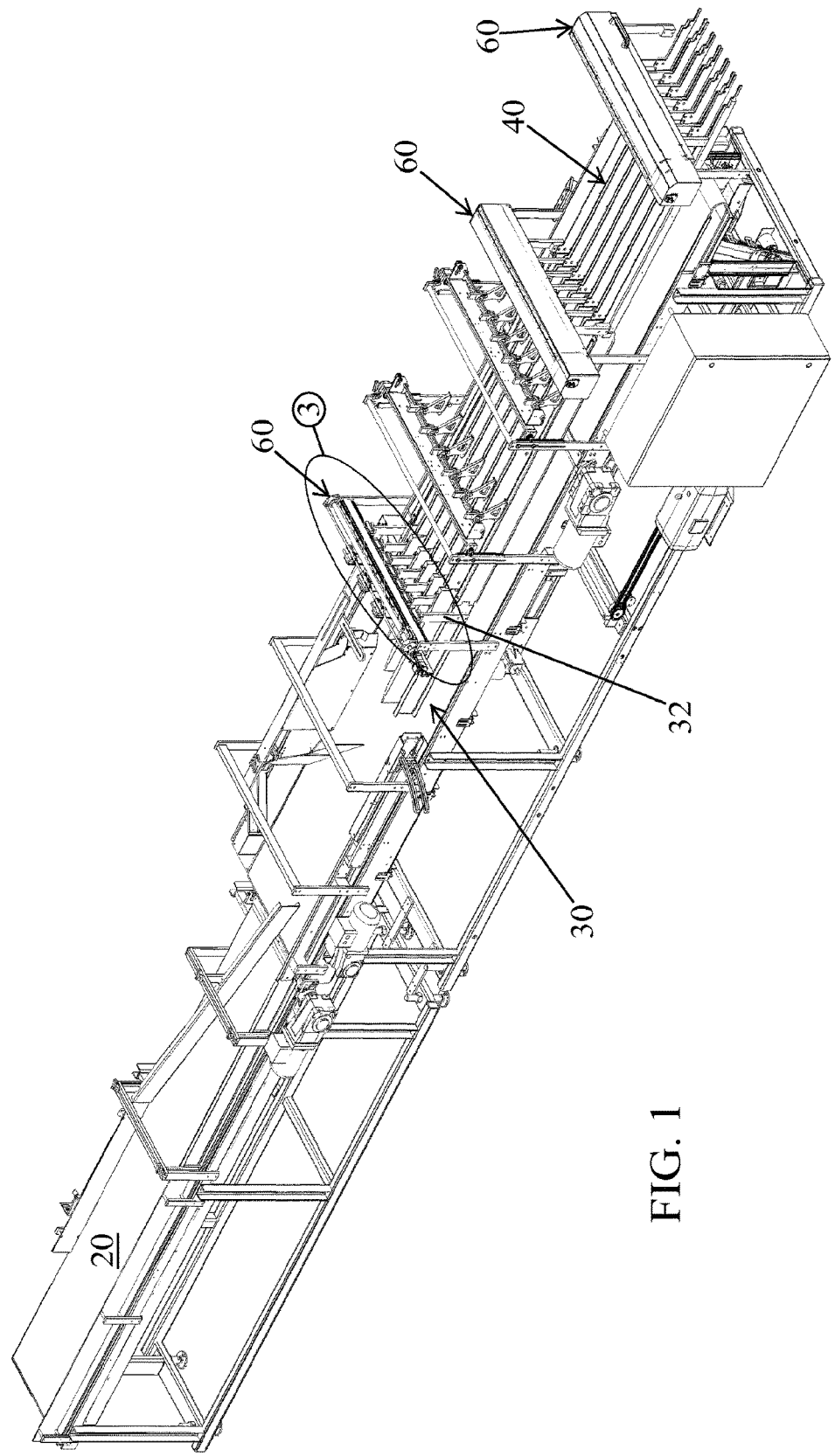
Figure 2:
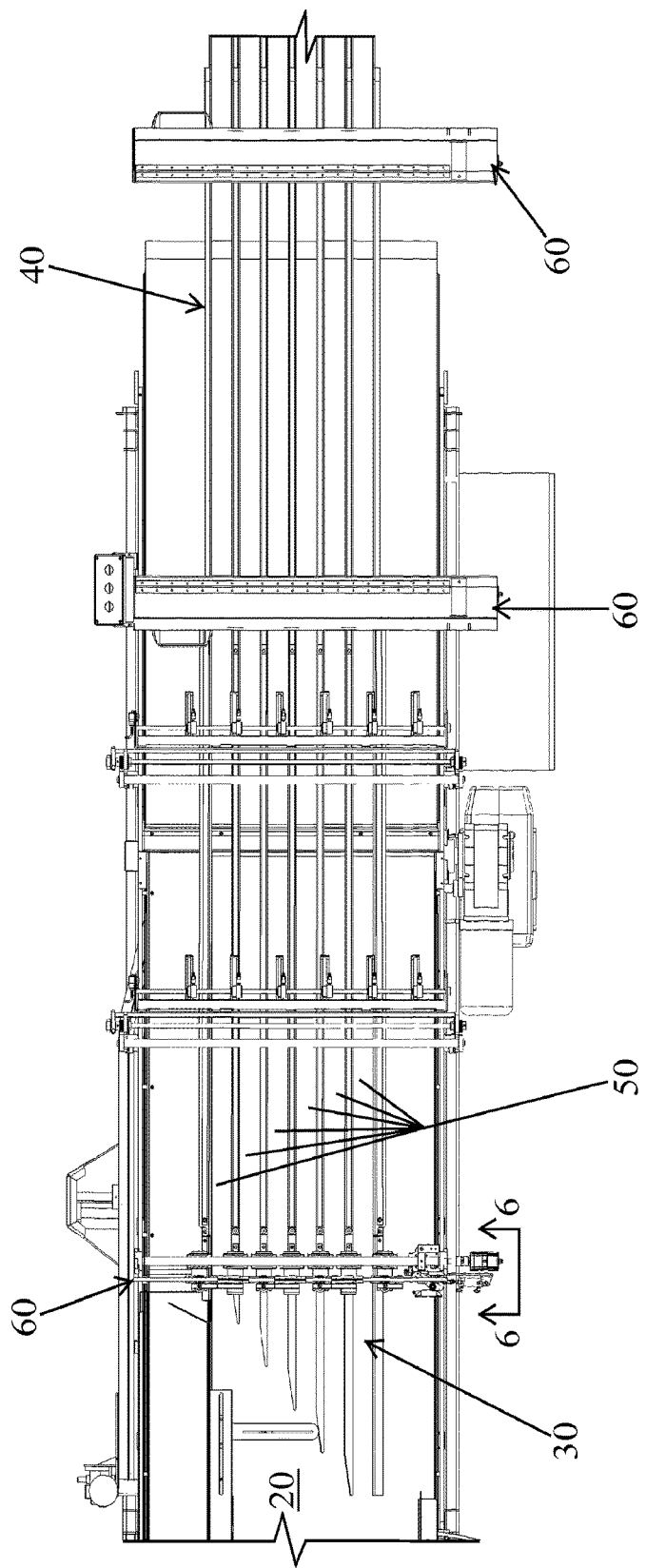
Figure 3:
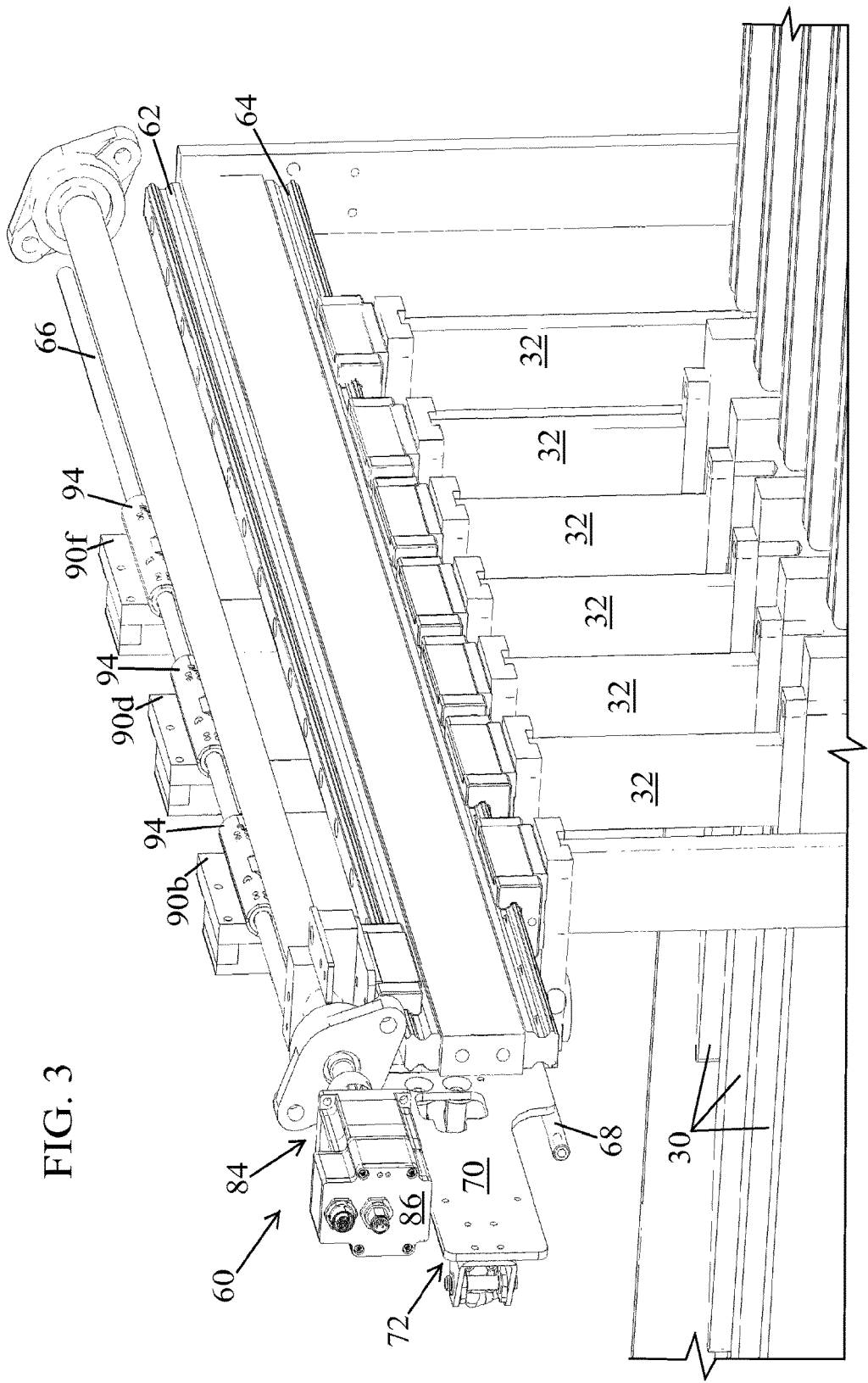

An illustrative, non-limiting auto changeover infeed assembly or module is generally shown in the several views of FIGS. 3-6 for the article infeed station depicted in the perspective and plan views thereof as per FIGS. 1 & 2 respectively. As to the station, article flow is from figure left to right upon conveyor 20 to and through upstream and down stream guide rails 30 & 40 which generally delimit article travel lanes 50. The contemplated assembly 60 is generally depicted and referenced in the views of FIGS. 1 & 2, more particularly, three (3) modules are shown, namely, a first module to effectuate automatic lane change for upstream guide rails 30 and a spaced apart pair of modules to effectuate automatic lane change for down stream guide rails 40. The number and/or location of modules is generally, but not exclusively, contingent upon lane properties, e.g., configuration, dimension, etc., which in turn are contingent upon article characteristics or properties, and/or article processing objectives. Substantive assembly particulars, in the context of the station shown, are provided with reference to the opposing perspective assembly views of FIGS. 3 & 4, with apparatus details especially provided in the context of the views/illustrations of each of FIGS. 5 & 6.

In advance of citation to illustrated assembly particulars, a preliminary notional operative description is believed advantageous. Essentially, a track mounted carriage equipped with a latch assembly traverses the width of the infeed conveyer for select capture of a guide rail hanger of a plurality of guide rail hangers extending from each of/a substantial number of a plurality of article guide rails. The guide rail hangers are mounted for translation along a track separate from the carriage track (i.e., a hanger track), and are locked/unlocked relative to a guide rail hanger positioning or anchoring bar which likewise traverses the width of the infeed conveyer. Upon release of a guide rail hanger positioning lock (e.g., an actuatable clamp, advantageously, a MECHLOK mechanical, linear locking device from Porter Group LLC, Michigan, USA) from the guide rail hanger positioning bar, and capture of the guide rail hanger by a latch of the latch assembly, the guide rail hanger slavingly travels along its track via travel of the carriage along its track to a new select position whereupon disengagement of the latch from the guide rail hanger effectuates an alternate locked location upon the guide rail hanger positioning bar, and thus an altered (i.e., adjusted) lane width.

With general reference to FIGS. 3-6, assembly 60 is advantageously characterized by a first track 62 (i.e., a carriage track), a second track 64 (i.e., a hanger track) spaced apart therefrom. At least a single guide rail hanger positioning or anchoring bar is contemplated, e.g., first upper bar 66 as shown, with provisions, as is likewise shown, for an advantageous second lower bar 68 spaced apart therefrom. A preferred, non-limiting spatial relationship for between and among the tracks and guide rail hanger positioning bars is best appreciated with reference to FIG. 6 wherein the tracks are coplanar, as are the bars.

A carriage 70 is mounted or otherwise engaged for driven travel upon first track 62, with guide rail hangers 90 (90a-90g as shown FIGS. 3 & 4)) mounted or otherwise engaged for slaved travel upon second track 64, and reversible unlocking from either of positioning bars 66, 68 (i.e., hangers 90b, 90d & 90f in relation to bar 66, hangers 90a, 90c, 90e, & 90g in relation to bar 68). As best seen with reference to FIG. 3, guide rail links 32 unite guide rails 30 to guide rail hangers 90.

Carriage 70 is conventionally driven, as by a drive assembly 84 via an operative combination of a motor 86 and a drive screw (not visible) driven thereby, the carriage operatively supported by the drive screw. A home position for the carriage is as generally illustrated, namely, at an end portion of the carriage rail proximal to the motor of the carriage drive assembly. Apparatus control is advantageously effectuated via a human-machine interface (HMI), with a threshold changeover initialization process (i.e., a position scan pass) executed whereby carriages travel along their travel path from the home position in furtherance of capturing initial/present lane offsets. Thereafter, each apparatus or module automatically calculates an adjustment solution, cumulatively with other apparatus/modules of the system/assembly. Carriers are driven in response to the adjustment solution, with the latch of the latch assembly selectively actuated during carriage travel to release guide rail hangers from the positioning or anchoring bar and capture of same for slaved travel of the guide rail hangers upon the hanger rail so as to relocate/reposition guide rail hangers as desired.

Figure 4:
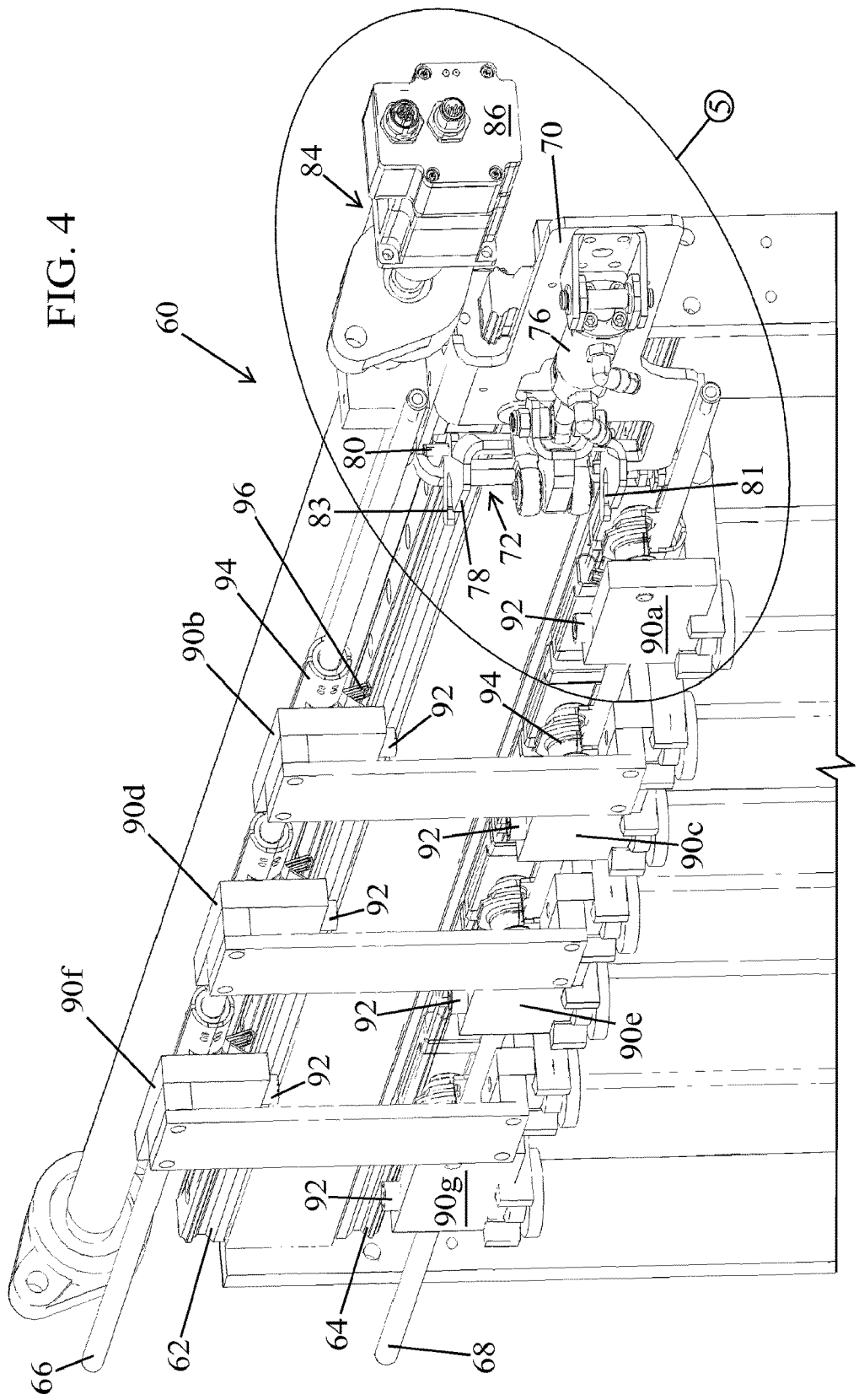
Figure 5:
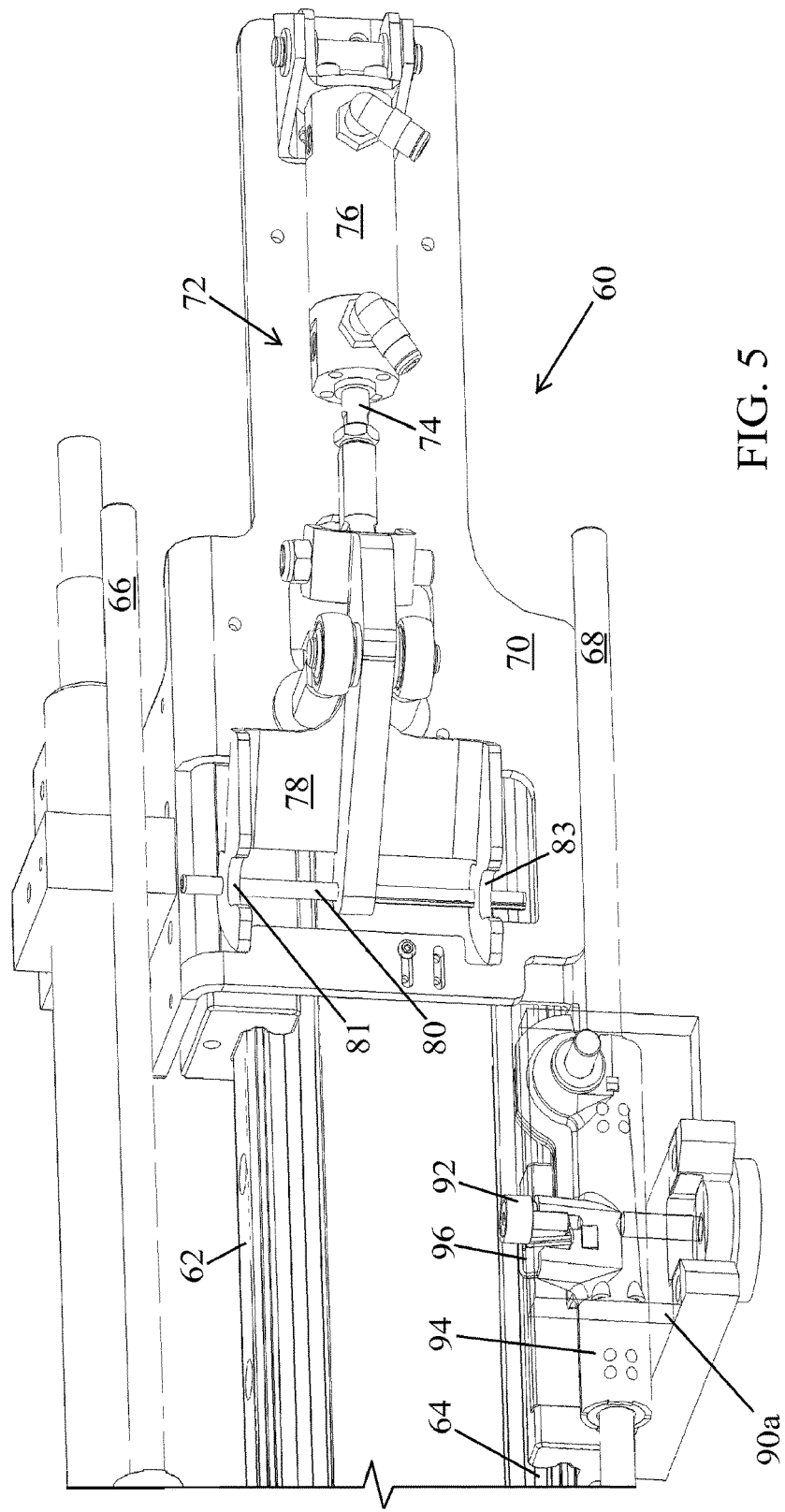
Figure 6:
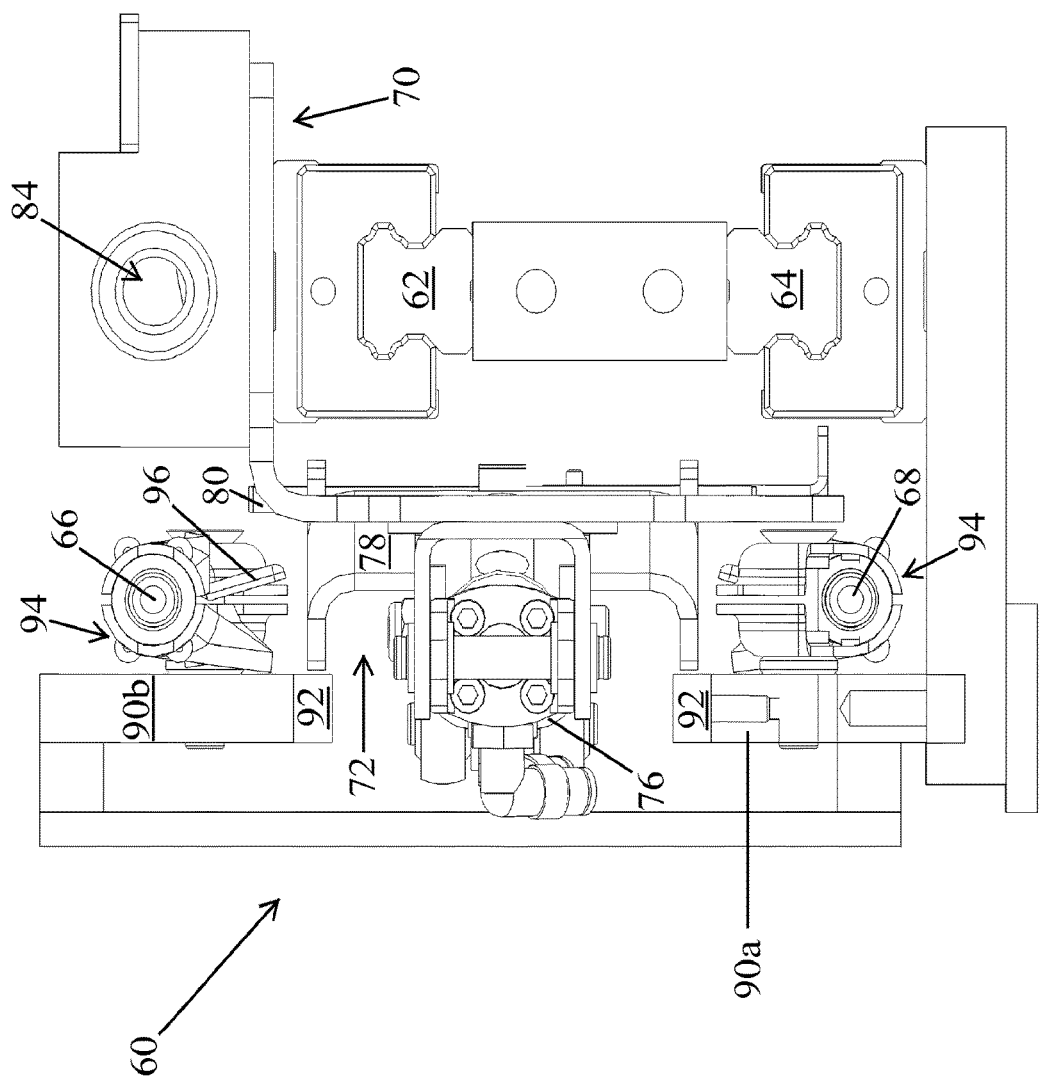

A latch assembly 72 (FIGS. 4-6), characterized by among other things a latch 78, is supported by carriage 70. Latch 78 of the latch assembly 72 is selectively operable for captured carrying (i.e., translation) of a guide rail hanger (e.g., 90g) of a plurality of guide rail hangers (e.g., 90a-90g) associated with each guide rail of a plurality of guide rails (FIG. 4). Latch 78 is advantageously, but not necessarily pneumatically actuatable via a carriage supported piston assembly characterized by rod 74 and cylinder 76 (FIGS. 5 & 6). Alternate conventional latch actuation mechanism are further contemplated for altering the alignment of the latch in furtherance of hanger capturing and hangar passing functions.

Latch 78 is pivotably mounted in respect to carriage 70 such that upon extension of rod 74, relative to cylinder 76, latch 78 of latch assembly 72 extends (i.e., outwardly FIG. 5, to the left FIG. 6) so as to capture a latch catch 92 of rail guide hanger 90; latch catches of hangers 90a, 90c, 90e & 90g of lower positioning bar upwardly extending, with latch catches 92 of hangers 90b, 90d & 90f of upper positioning bar 66 downwardly extending as shown for corresponding capture in or by opposing lower 81 and upper 83 latch notches, respectively, delimiting latch 78. Moreover, latch actuation permits a tension pin 80 of latch assembly 72 to engage hanger clamp 94, more particularly an actuator 96 thereof, secured about its positioning bar (FIG. 6) to thereby free guide rail hanger 90 for slaved travel upon track 64.

Finally, since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal article processing has be described and detailed, and to some degree alternate work pieces and systems, assemblies, etc. with regard thereto referenced, contemplated article processes are not so limited. Accordingly, the scope of the subject invention is as defined in the language of the appended claims, and includes not insubstantial equivalents thereto.

That which is claimed:

1. Apparatus for automatic adjustment of guide rails for guiding articles on a conveyor via lanes comprising:
   a. spaced apart first and second tracks, said first track delimiting a carriage travel path, said second track delimiting a guide rail hanger travel path;
   b. a guide rail hanger positioning bar;
   c. a carriage for driven travel along said first track;
   d. a guide rail hanger for select slaved travel along said second track by said carriage in furtherance of lane adjustment, said guide rail hanger operatively linked with said guide rail hanger positioning bar for select reversible affixation with respect thereto in furtherance of establishing a fixed guide rail position relative to the conveyor;
   e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof, said latch of said latch assembly being pivotable relative to said carriage.

2. The apparatus of claim 1 wherein said guide rail hanger includes a hanger clamp for reversibly affixing said guide rail hanger to said guide rail hanger positioning bar.

3. The apparatus of claim 1 wherein said guide rail hanger includes a latch catch for capture by said latch of said latch assembly.

4. Apparatus for automatic adjustment of guide rails for guiding articles on a conveyor via lanes comprising:
   a. spaced apart first and second tracks, said first track delimiting a carriage travel path, said second track delimiting a guide rail hanger travel path;
   b. a guide rail hanger positioning bar;
   c. a carriage for driven travel along said first track;
   d. a guide rail hanger for select slaved travel along said second track by said carriage in furtherance of lane adjustment, said guide rail hanger operatively linked with said guide rail hanger positioning bar for select reversible affixation with respect thereto in furtherance of establishing a fixed guide rail position relative to the conveyor;
   e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof, said latch assembly being pivotable between a guide rail hanger capture configuration and a guide rail hanger passing configuration.

5. The apparatus of claim 4 wherein said guide rail hanger includes a hanger clamp for reversibly affixing said guide rail hanger to said guide rail hanger positioning bar.

6. The apparatus of claim 4 wherein said guide rail hanger includes a latch catch for capture by said latch of said latch assembly.

7. Apparatus for automatic adjustment of guide rails for guiding articles on a conveyor via lanes comprising:
   a. spaced apart first and second tracks, said first track delimiting a carriage travel path, said second track delimiting a guide rail hanger travel path;
   b. a guide rail hanger positioning bar;
   c. a carriage for driven travel along said first track;
   d. a guide rail hanger for select slaved travel along said second track by said carriage in furtherance of lane adjustment, said guide rail hanger operatively linked with said guide rail hanger positioning bar for select reversible affixation with respect thereto in furtherance of establishing a fixed guide rail position relative to the conveyor;
   e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof, said latch assembly including a pneumatic actuator operatively united with said latch of said latch assembly, said pneumatic actuator effectuating pivoting of said latch between a guide rail hanger capture configuration and a guide rail hanger passing configuration.

8. The apparatus of claim 7 wherein said guide rail hanger includes a hanger clamp for reversibly affixing said guide rail hanger to said guide rail hanger positioning bar.

9. The apparatus of claim 7 wherein said guide rail hanger includes a latch catch for capture by said latch of said latch assembly.

10. Apparatus for automatic adjustment of guide rails for guiding articles on a conveyor via lanes comprising:
    a. spaced apart first and second tracks, said first track delimiting a carriage travel path, said second track delimiting a guide rail hanger travel path;
    b. a guide rail hanger positioning bar, said guide rail hanger positioning bar being a first guide rail hanger positioning bar, the apparatus further comprising a second guide rail hanger positioning bar spaced apart from said first guide rail hanger positioning bar;
    c. a carriage for driven travel along said first track;
    d. a guide rail hanger for select slaved travel along said second track by said carriage in furtherance of lane adjustment, said guide rail hanger operatively linked with said guide rail hanger positioning bar for select reversible affixation with respect thereto in furtherance of establishing a fixed guide rail position relative to the conveyor;
    e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof.

11. The apparatus of claim 10 wherein said guide rail hanger comprises a plurality of guide rail hangers, guide rail hangers thereof correlating with serially adjacent guide rails for guiding articles on a conveyor, guide rail hangers alternately distributed with respect to said first and second hanger positioning bars.

12. The apparatus of claim 11 wherein said latch of said latch assembly is passable intermediate said first and second hanger positioning bars.

13. The apparatus of claim 12 wherein said latch comprises opposing upper and lower latch notches for capturing guide rail hangers of either of said first or second guide rail hanger positioning bars.

14. The apparatus of claim 10 wherein said guide rail hanger includes a hanger clamp for reversibly affixing said guide rail hanger to said guide rail hanger positioning bar.

15. The apparatus of claim 10 wherein said guide rail hanger includes a latch catch for capture by said latch of said latch assembly.

16. Apparatus for automatic adjustment of guide rails for guiding articles on a conveyor via lanes comprising:
    a. spaced apart first and second tracks, said first track delimiting a carriage travel path, said second track delimiting a guide rail hanger travel path;
    b. a guide rail hanger positioning bar;
    c. a carriage for driven travel along said first track;
    d. a guide rail hanger for select slaved travel along said second track by said carriage in furtherance of individual lane width adjustment, said guide rail hanger operatively linked with said guide rail hanger positioning bar for select reversible affixation with respect thereto in furtherance of establishing a fixed guide rail position relative to the conveyor;
- e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof; and,
- f. a carriage drive assembly characterized by a motor and drive screw driven thereby, said carriage operatively linked with said drive screw.

17. The apparatus of claim 16 wherein said guide rail hanger includes a hanger clamp for reversibly affixing said guide rail hanger to said guide rail hanger positioning bar.

18. The apparatus of claim 16 wherein said guide rail hanger includes a latch catch for capture by said latch of said latch assembly.

19. Apparatus for automatic adjustment of guide rails for guiding articles on a conveyor via lanes comprising:
- a. spaced apart coplanar first and second tracks, said first track delimiting a carriage travel path, said second track delimiting a guide rail hanger travel path;
- b. a guide rail hanger positioning bar;
- c. a carriage for driven travel along said first track;
- d. a guide rail hanger for select slaved travel along said second track by said carriage in furtherance of individual lane width adjustment, said guide rail hanger operatively linked with said guide rail hanger positioning bar for select reversible affixation with respect thereto in furtherance of establishing a fixed guide rail position relative to the conveyor; and,
- e. a latch assembly, supported by said carriage, having a latch selectively operable for captured carrying of said guide rail hanger along said second track during travel of said carriage along said carriage travel path, said latch effectuating release of an affixed guide rail hanger from said guide rail hanger positioning bar in furtherance of enabling relocating and re-affixing said guide rail hanger relative to said guide rail hanger positioning bar in advance of captured carrying thereof.

20. The apparatus of claim 19 wherein said guide rail hanger operatively extends from said second track.

21. The apparatus of claim 19 wherein said guide rail hanger operatively extends from said second track for cooperative engagement with said guide rail hanger positioning bar.

22. The apparatus of claim 19 wherein said guide rail hanger operatively links said guide rail hanger positioning bar with said second track.

23. The apparatus of claim 19 wherein said guide rail hanger includes a hanger clamp for reversibly affixing said guide rail hanger to said guide rail hanger positioning bar.

24. The apparatus of claim 19 wherein said guide rail hanger includes a latch catch for capture by said latch of said latch assembly.

25. The apparatus of claim 19 wherein said guide rail hanger comprises a plurality of guide rail hangers, each guide rail hanger correlating with a guide rail for guiding articles on a conveyor.

26. The apparatus of claim 19 wherein said guide rail hanger comprises a plurality of guide rail hangers, guide rail hangers thereof correlating with serially adjacent guide rails for guiding articles on a conveyor.

* * * * *